(12) United States Patent
Chamoun (10) Patent No.: US 9,010,795 B2
(45) Date of Patent: Apr. 21, 2015

(54) HITCH MECHANISM

(76) Inventor: Teffy R. Chamoun, Sycamore, IL (US)

(*) Notice: Subject to any disclaimer, the term of this patent is extended or adjusted under 35 U.S.C. 154(b) by 302 days.

(21) Appl. No.: 13/112,107

(22) Filed: May 20, 2011

(65) Prior Publication Data

US 2011/0285108 A1 Nov. 24, 2011

Related U.S. Application Data (60) Provisional application No. 61/346,785, filed on May 20, 2010.

(51) Int. Cl.
*B60D 1/06* (2006.01)
*B60D 1/28* (2006.01)

(52) U.S. Cl.
CPC . *B60D 1/065* (2013.01); *B60D 1/28* (2013.01)

(58) Field of Classification Search
CPC ............ B60D 1/00; B60D 1/06; B60D 1/065; B60D 1/28
USPC .......................................... 280/504, 511, 514
See application file for complete search history.

(56) References Cited

U.S. PATENT DOCUMENTS

| 2,125,479 | A | * | 8/1938 | Zagelmeyer | 280/511 |
| 2,127,359 | A | * | 8/1938 | Harley | 280/513 |
| 3,790,192 | A | * | 2/1974 | Green | 280/507 |
| 4,193,611 | A | * | 3/1980 | Fisk | 280/416.1 |
| 4,209,184 | A | * | 6/1980 | Byers | 280/511 |
| 4,242,877 | A | * | 1/1981 | Geerkens | 62/93 |
| 4,986,059 | A | * | 1/1991 | Boutilier | 54/2 |
| 5,228,712 | A | * | 7/1993 | Speier | 280/401 |
| 6,089,591 | A | * | 7/2000 | Thomas | 280/511 |
| 7,017,935 | B1 | * | 3/2006 | Bonfanti | 280/511 |
| 7,316,534 | B2 | * | 1/2008 | Hohmann et al. | 411/340 |
| 7,571,922 | B2 | * | 8/2009 | Pratchler | 280/477 |
| 2003/0025297 | A1 | * | 2/2003 | Brown et al. | 280/511 |
| 2009/0079157 | A1 | * | 3/2009 | Fratzke | 280/166 |

* cited by examiner

*Primary Examiner* — Anne Marie Boehler
*Assistant Examiner* — Maurice Williams
(74) *Attorney, Agent, or Firm* — Husch Blackwell LLP (57) ABSTRACT

An improved hitch mechanism is provided that includes an elongated shaft for connecting with a ramp or trailer, and a mating member for connecting with a tow ball of a tow hitch. The mating member includes a chamber disposed therein for housing the tow ball in a first position and in a second position. When the tow ball is in the first position in the chamber, the mating member and the elongated shaft are rigid relative to the tow hitch. When the tow ball is in the second position in the chamber, the mating member and the elongated shaft are non-rigid relative to the tow hitch.

18 Claims, 9 Drawing Sheets

FIG. 9

HITCH MECHANISM

CROSS-REFERENCE TO RELATED APPLICATIONS

This application claims priority to U.S. Provisional Patent Application No. 61/346,785 filed May 20, 2010 and titled "Improved Trailer Hitch Mechanism."

FIELD OF INVENTION

The present invention relates generally to hitches and more particularly to an improved hitch mechanism.

BACKGROUND

A tow hitch is a device attached to the chassis of a vehicle for towing. Tow hitches known to those of skill in the art can include a tow ball, and a hitch mechanism can include a socket that receives and secures the tow ball for affixing another apparatus to the hitch. The tow ball and socket allow for swiveling and articulation of the apparatus while preventing disengagement of the hitch mechanism from the tow ball.

Known hitch mechanisms are not rigid relative to the tow ball and tow hitch associated with the vehicle. However, in various applications it is desirable to have a rigid assembly that connects to the tow ball. Nonetheless, it is undesirable to replace a trailer mechanism with a permanently rigid assembly as the need can change between the need for a rigid assembly and the need for a non-rigid assembly.

For example, U.S. application Ser. No. 12/537,621 filed Aug. 7, 2009 and titled "Loading Ramp and Trailer," which is hereby incorporated by reference, discloses an apparatus that can function as a ramp in one position and a trailer in another position. It would be desirable to hitch the apparatus to a tow hitch so that the apparatus is rigid relative to the tow hitch when the apparatus is functioning as a ramp. It would also be desirable to hitch the apparatus to a tow hitch so that the apparatus is non-rigid relative to the tow hitch when the apparatus is functioning as a trailer. Furthermore, it would be desirable to employ only one hitch mechanism to hitch the apparatus to the tow hitch so that the hitch mechanism need not be changed when the apparatus changes from functioning ramp to functioning as a trailer.

There is thus a continuing ongoing need for an improved hitch mechanism. Preferably, such an improved hitch mechanism can move between rigid and non-rigid positions relative to a tow hitch associated with a vehicle.

SUMMARY OF THE INVENTION

According to one embodiment of the present invention, an apparatus is provided. The apparatus can include an elongated shaft for connecting with a ramp or trailer, and a mating member for connecting with a tow ball of a tow hitch. The mating member can include a chamber disposed therein for housing the tow ball in a first position and in a second position. When the tow ball is in the first position in the chamber, the mating member and the elongated shaft can be rigid relative to the tow hitch, and when the tow ball is in the second position in the chamber, the mating member and the elongated shaft can be non-rigid relative to the tow hitch.

In some embodiments, the mating member can include a first side defining an open side of the chamber a domed side defining a domed side of the chamber.

First and second opposing apertures can be disposed in the mating member, wherein the first and second opposing apertures are suitable for receiving a single fastener therethrough. The tow ball can also include a tow ball aperture suitable for receiving the fastener therethrough.

In some embodiments, when the tow ball is in the first position in the chamber, the fastener can be disposed in the first and second opposing apertures of the mating member and in the tow ball aperture of the tow ball. When the tow ball is in the second position in the chamber, the fastener can be disposed in the first and second opposing apertures of the mating member and adjacent to the tow ball. The fastener can include a pin, and the pin can include a spring loaded pin.

According to some embodiments, when the tow ball is in the first position in the chamber, the mating member can be flush with the tow hitch. When the tow ball is in the second position in the chamber, a clearance can be disposed between the mating member and the tow hitch. Furthermore, when the tow ball is in the second position in the chamber, the mating member can be capable or rotating in any of up, down, left, and right directions relative to the tow hitch.

According to another embodiment, a mating member of a hitch mechanism is also provided. The mating member can include a curved side defining a chamber disposed therein, a flat side defining an opening of the chamber, and first and second opposing apertures disposed in the curved side suitable for receiving a single fastener therein. A first portion of the chamber can have a first diameter, and a second portion of the chamber can have a second diameter. In some embodiments, the first diameter can be larger than the second diameter.

The first portion of the chamber can be capable of housing a whole tow ball, and the member can be rigid relative to the tow ball when the first portion of the chamber houses the whole tow ball. The second portion of the chamber can be capable of housing a majority of a tow ball such that a portion of the tow ball is not housed by the chamber. The member can be non-rigid relative to the tow ball when the second portion of the chamber houses the majority of the tow ball such that the portion of the tow ball is not housed by the chamber. The member is capable of rotating in any of up, down, left, and right directions when the member is non-rigid relative to the tow ball.

In some embodiments, a tow ball can be capable of sliding between the first portion of the chamber and the second portion of the chamber.

DESCRIPTION OF THE PREFERRED EMBODIMENTS

While this invention is susceptible of an embodiment in different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include an improved hitch mechanism. Preferably, such an improved hitch mechanism can move between rigid and non-rigid positions relative to a tow hitch associated with a vehicle.

According to the present invention, in a first position, the hitch mechanism can be in a rigid and locked position relative to the tow hitch. In the first position, the hitch mechanism can remain fixed relative to the tow hitch to support, for example, a loading ramp or the like associated with the hitch mechanism.

In a second position, the hitch mechanism can be in a non-rigid and unlocked position relative to the tow hitch. Thus, in the second position, the hitch mechanism can move, swivel, and articulate relative to the tow hitch to support, for example, a trailer associated with the trailer hitch mechanism.

In some embodiments of the present invention, the hitch mechanism can move, swivel, and articulate in any direction when in the non-rigid and unlocked position. For example, the hitch mechanism can move, swivel, and articulate in the up, down, left, and right directions relative to the tow hitch.

The hitch mechanism in accordance with the present invention can easily move between the first and second positions. In some embodiments, a single user can disengage and re-engage a fastener to move the hitch mechanism from the first position to the second position It is to be understood that the improved hitch mechanism in accordance with the present invention can be used in connection with any type of trailer, ramp, or other apparatus. The hitch mechanism in accordance with the present invention can also be used in a variety of other applications. For example, the hitch mechanism in accordance with the present invention can be used to affix two or more transport vehicles together.

Figure 1:
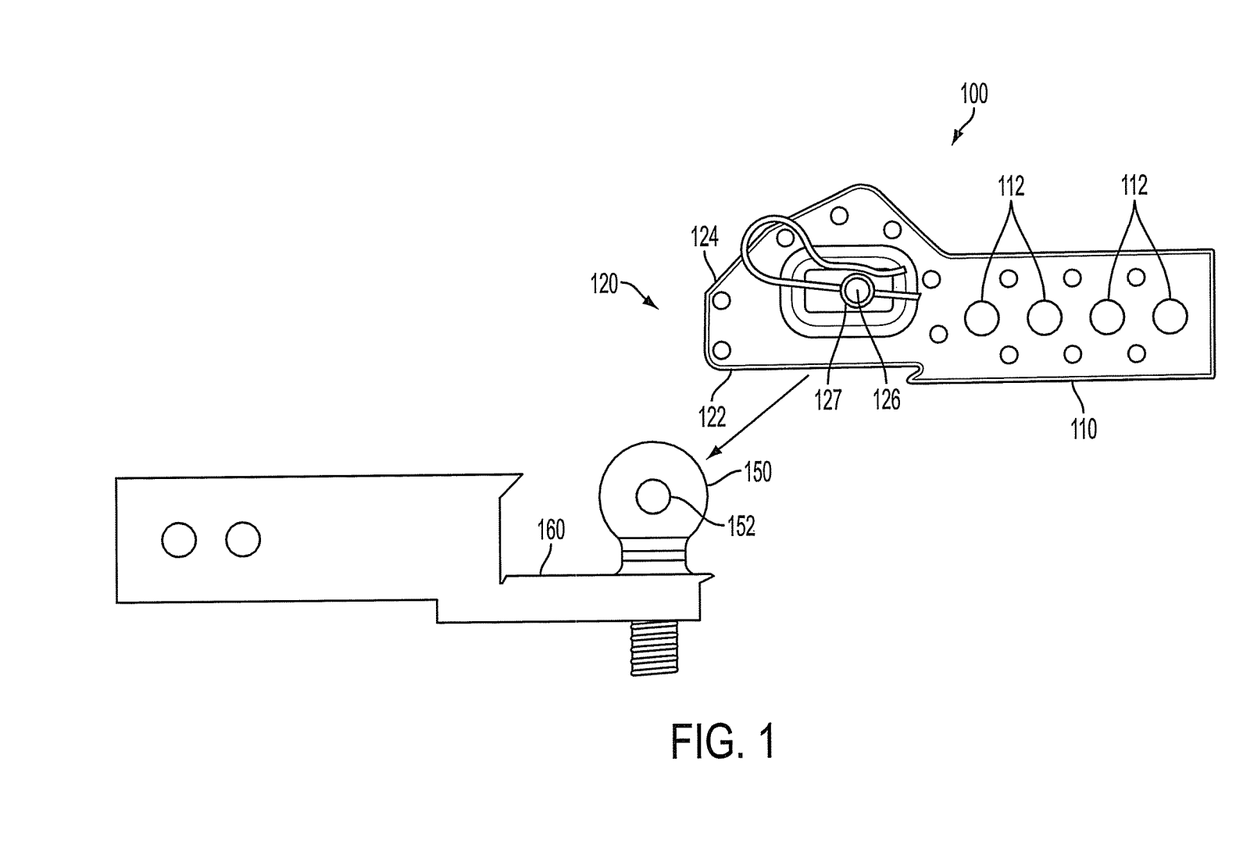
FIG. 1 is a first side view of an improved hitch mechanism in accordance with the present invention disconnected from a tow ball.

FIG. 1 is a first side view of an improved hitch mechanism 100 in accordance with the present invention disconnected from a tow ball 150. As seen in FIG. 1, the mechanism 100 can include an elongated shaft 110 that is contiguous with a mating member 120.

The elongated shaft 110 can be rectangular or any other shape that would be suitable for connected to an apparatus, for example, a trailer, ramp, or the like. As seen in FIG. 1, the elongated shaft 110 can include a plurality of apertures 112 for receiving fasteners of an associated trailer, ramp, or the like.

Figure 3:
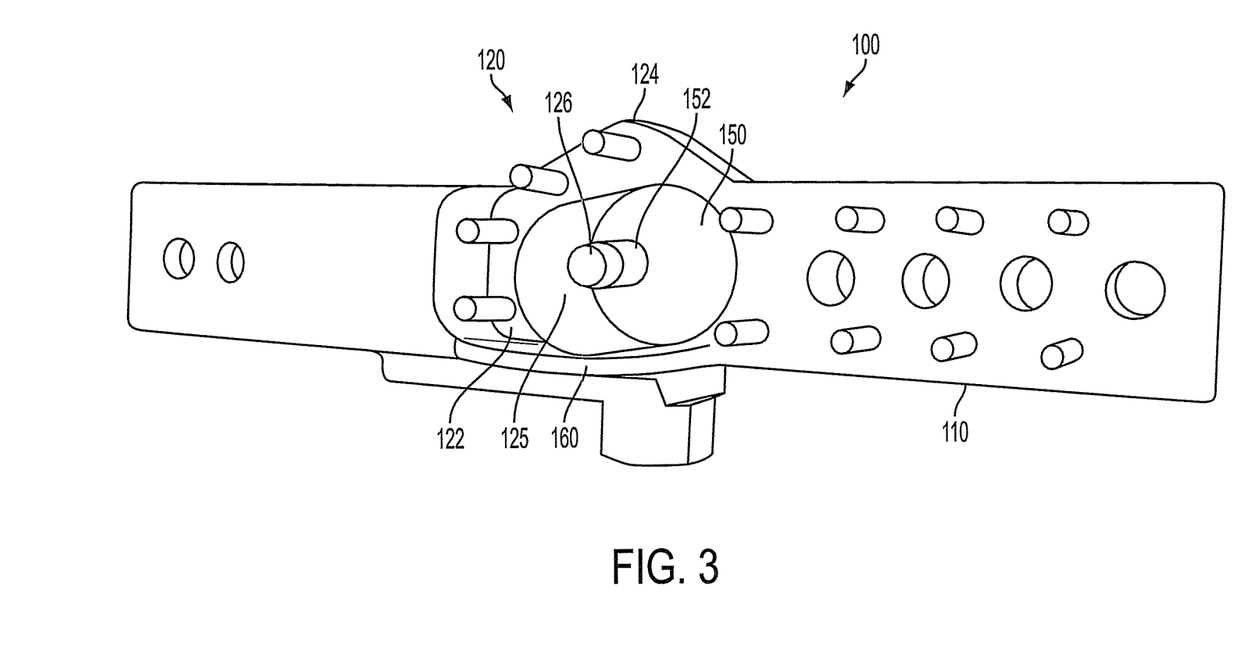
FIG. 3 is a cross-sectional view of the hitch mechanism of FIG. 1 connected to the tow ball in the locked position.
Figure 5:
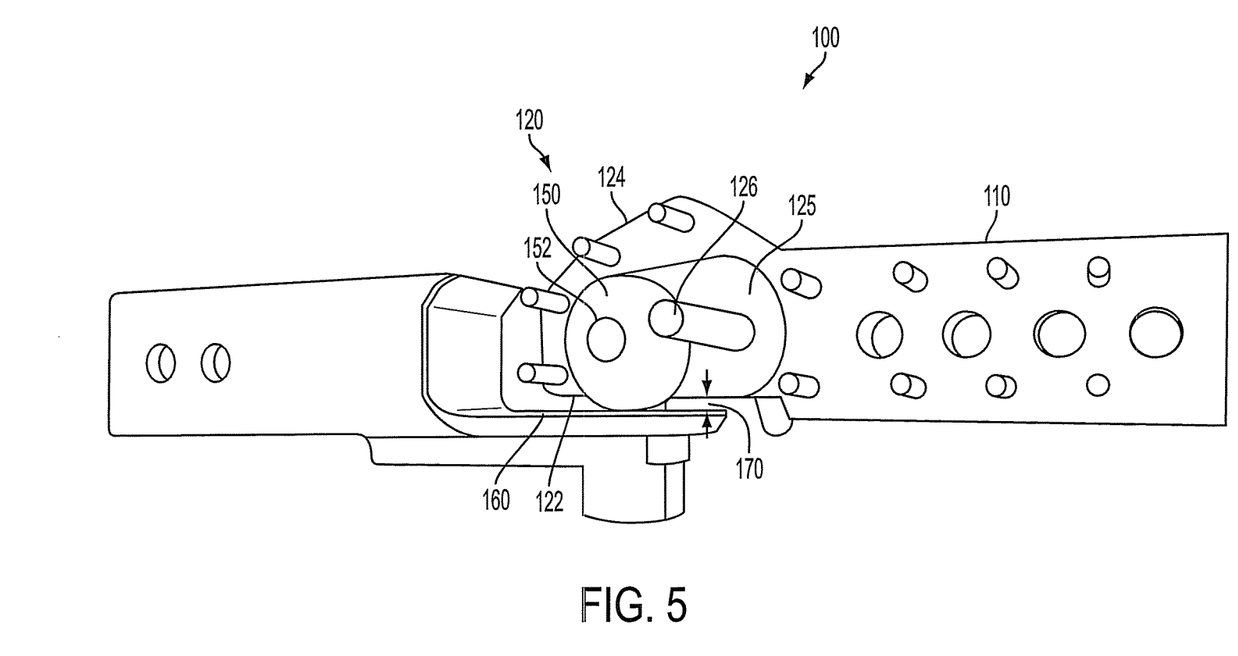
FIG. 5 is a cross-sectional view of the hitch mechanism of FIG. 1 connected to the tow ball in the unlocked position.

The mating member 120 can include a flat side 122 and a domed side 124. As best seen in FIGS. 3 and 5, the flat side 122 can define an open side of a recess or chamber 125 that can receive and house the tow ball 150. The curved or domed side 124 can define a curvature of the chamber 125.

Opposing apertures 127 and 127' can be disposed in corresponding first and second sides of the mating member 120, specifically in the domed side 124 of the mating member 120. In embodiments of the present invention, the apertures 127 and 127' can be suitable for receiving a fastener therethrough.

For example, a fastener 126, for example a pin, can be disposed in and through the apertures 127 and 127' in the mating member 120. In some embodiments, the fastener 126 can extend past first and second sides of the mating member 120. In some embodiments, the fastener 126 can traverse an interior portion of the chamber 125.

The mating member 120 of the mechanism 100 can be placed over the tow ball 150 so as to receive the tow ball 150 in the chamber 125 of the mating member 120. As seen in FIG. 1, the tow ball 150 can be associated with a tow hitch 160, and the tow ball 150 can include an aperture 152 disposed therethrough. In embodiments of the present invention, the aperture 152 can be substantially centrally located in the tow ball 150 and be suitable for receiving a fastener therethrough.

Figure 2:
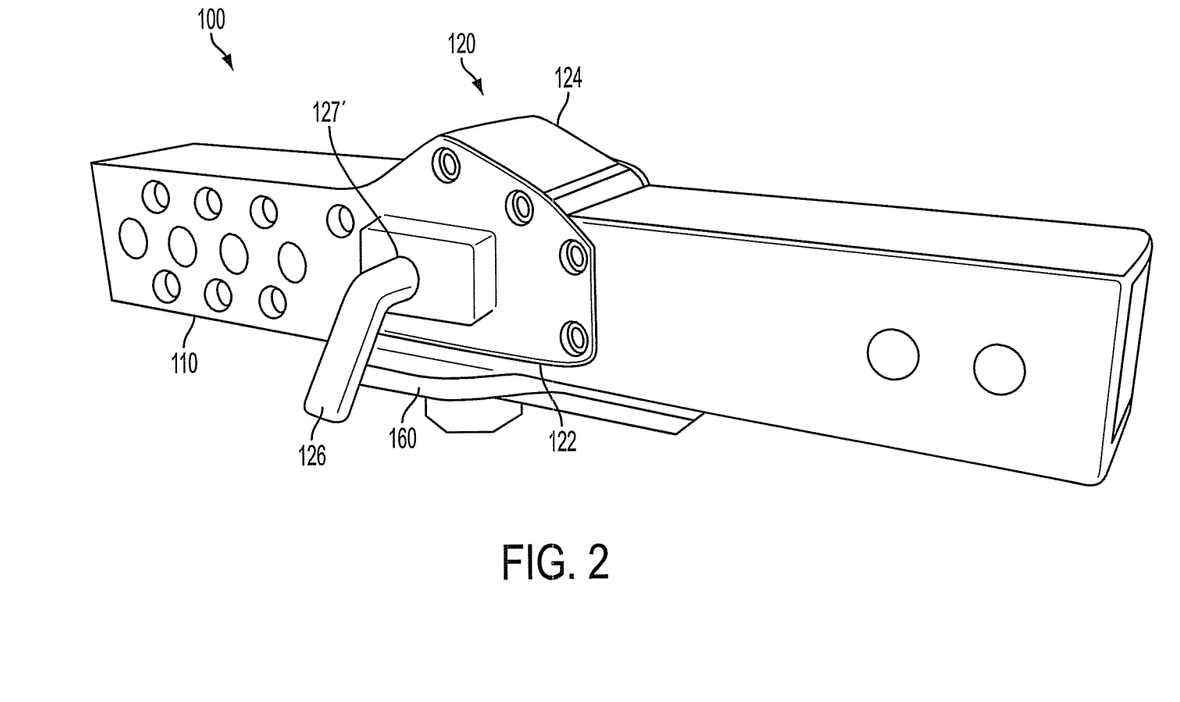
FIG. 2 is a second side view of the hitch mechanism of FIG. 1 connected to the tow ball in a locked position.

FIG. 2 is a second side view of the trailer hitch mechanism 100 connected to the tow ball 150, and FIG. 3 is a cross-sectional view of the trailer hitch mechanism 100 connected to the tow ball 150. The mechanism 100 seen in FIGS. 2 and 3 is in a first position, that is, a rigid and locked position relative to the tow ball 150.

The mating member 120 and tow ball 150 can act as a ball and socket. However, in the first position, that is, the rigid and locked position, the fastener 126 can traverse both the chamber 125 of the mating member 120 and the tow ball 150 itself to limit the movement of the mating member 120 relative to the tow ball. For example, the fastener 126 can be disposed through both apertures 127 and 127' in the mating member 120 as well as through the aperture 152 in the tow ball 150.

In the rigid and locked position, the fastener 125 can fix the tow ball 150 relative to the mating member 120 to prevent the mating member 120 from rotating, swiveling, and articulating relative to the tow ball 150. Thus, in the rigid and locked position, the mechanism 100 is fixed relative to the tow ball 150 and the tow hitch 160.

The tow ball 150 can move between first and second positions within the chamber 125 of the mating member 120. In the first position seen in FIG. 3, the fastener 126 extends through aperture 152 of the tow ball 150. However, in the second position seen in FIG. 5, the fastener 126 does not extend through aperture 152 of the tow ball 150. Rather, in the second position, the fastener 126 can be disposed through only the apertures 127 and 17' of the mating member 120 and be disposed adjacent to the tow ball 150.

Figure 4:
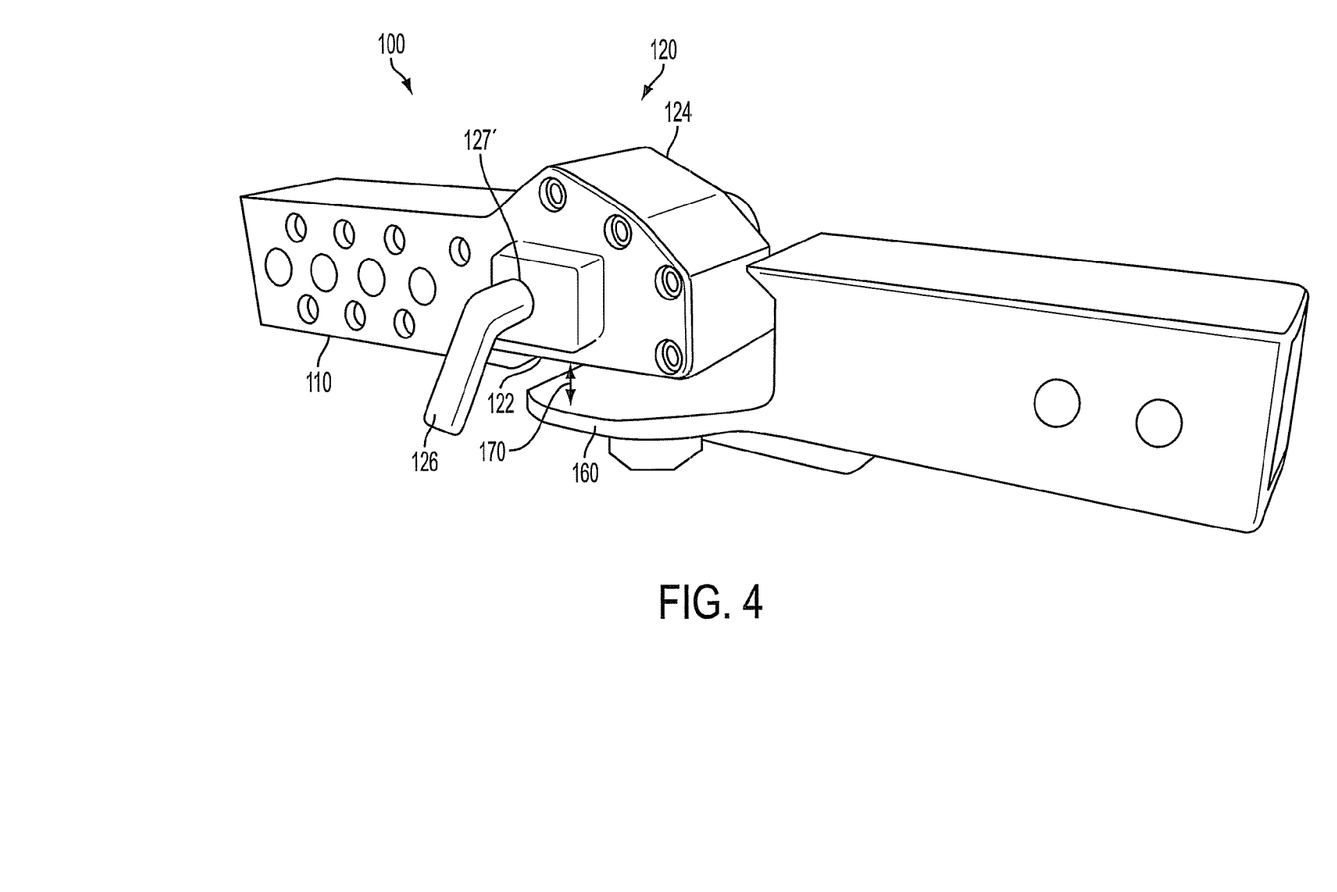
FIG. 4 is a second side view of the hitch mechanism of FIG. 1 connected to the tow ball in an unlocked position.

FIG. 4 is a second side of the trailer hitch mechanism 100 connected to the tow ball 150, and FIG. 5 is a cross-sectional view of the trailer hitch mechanism 100 connected to the tow ball 150. The mechanism 100 seen in FIGS. 4 and 5 is in a non-rigid and unlocked position relative to the tow ball 150.

As explained above, the mating member 120 and the tow ball 150 can act as a ball and socket. Thus, when the tow ball 150 is in the second position within the chamber 125 of the mating member 120, the mating member 120 can rotate, swivel, and articulate in any direction relative to the tow ball 150. When the tow ball 150 is in the second position within the chamber 125, the fastener 126 does not restrict movement of the mating member 120 relative to the tow ball 150 and the tow hitch 160.

To move the mechanism 100 from a rigid and locked position to a non-rigid and unlocked position, the tow ball 150 can be moved from the first position in the chamber 150 to the second position in the chamber 150. Furthermore, to move the tow ball 150 from the first position in the chamber 125 to the second position in the chamber 125, the fastener 126 can be disengaged from the tow ball 150.

For example, when the tow ball 150 is in the first position in the chamber 125, the fastener 126 can be disposed through the aperture 152 of the tow ball. To move the tow ball 150, the fastener 126 first can be disengaged from the tow ball 150 so as to remove the fastener 126 from the aperture 152. Then, the mating member 100 can be moved, for example, slid relative to the tow ball 150 to place the tow ball 150 in the second position in the chamber 125. Once the tow ball 125 is in the second position in the chamber 125, the fastener 126 can be re-engaged so that the fastener 126 is disposed through the apertures 127 and 127' of the mating member 120, but not through the aperture 152 of the tow ball 150. That is, when the tow ball 150 is in the second position in the chamber 125, the fastener 126 can be re-engaged so that the fastener 126 is disposed adjacent to the tow ball 150.

In embodiments of the present invention, the fastener 126 can be spring loaded. For example, when the fastener 126 is disengaged from the tow ball 150, a spring associated with the fastener can be loaded. Then, the spring can be unloaded to re-engage the fastener 126 with the mating member 120. In this manner, a single user can easily move the fastener 126 and mating member 120 relative to the tow ball 150.

As best seen in FIGS. 3 and 5, the chamber 125 of the mating member 120 can be curved or domed to accommodate the tow ball 150. A first portion of the chamber 125 can have a first diameter, and a second portion of the chamber 125 can have a second diameter. The first diameter can be larger than the second diameter.

The first portion of the chamber 125 with the first, larger diameter can correspond to the portion of the chamber 125 that accommodates the tow ball 150 in the first, locked position. Thus, as seen in FIG. 3, the diameter of the first portion of the chamber 125 can be large enough to fully house the tow ball 150. Accordingly, when the tow ball 150 is in the first, locked position in the chamber 125, the flat side 122 of the mating member 120 can be flush with the tow hitch 160 associated with the tow ball 150.

The second portion of the chamber 125 with the second, smaller diameter can correspond to the portion of the chamber 125 that accommodates the tow ball 150 in the second, unlocked position. Thus, as seen in FIG. 5, the diameter of the second portion of the chamber can be large enough to accommodate and house the majority of the tow ball 150, but small enough so that a bottom portion of the tow ball 150 is not housed in the chamber 125. That is, a bottom portion of the tow ball 150 can be outside of the second portion of the chamber 125 while the majority of the tow ball 150 is being housed by the second portion of the chamber 125.

As seen in FIG. 5, the arrangement of the tow ball 150 relative to the mating member 120 and second portion of the chamber 150 therein provides a clearance 170 between the flat side 122 of the mating member 120 and the tow hitch 160. This clearance 170 provides room and space for the mechanism 100 to rotate, swivel, and articulate relative to the tow ball 150.

Figure 6:
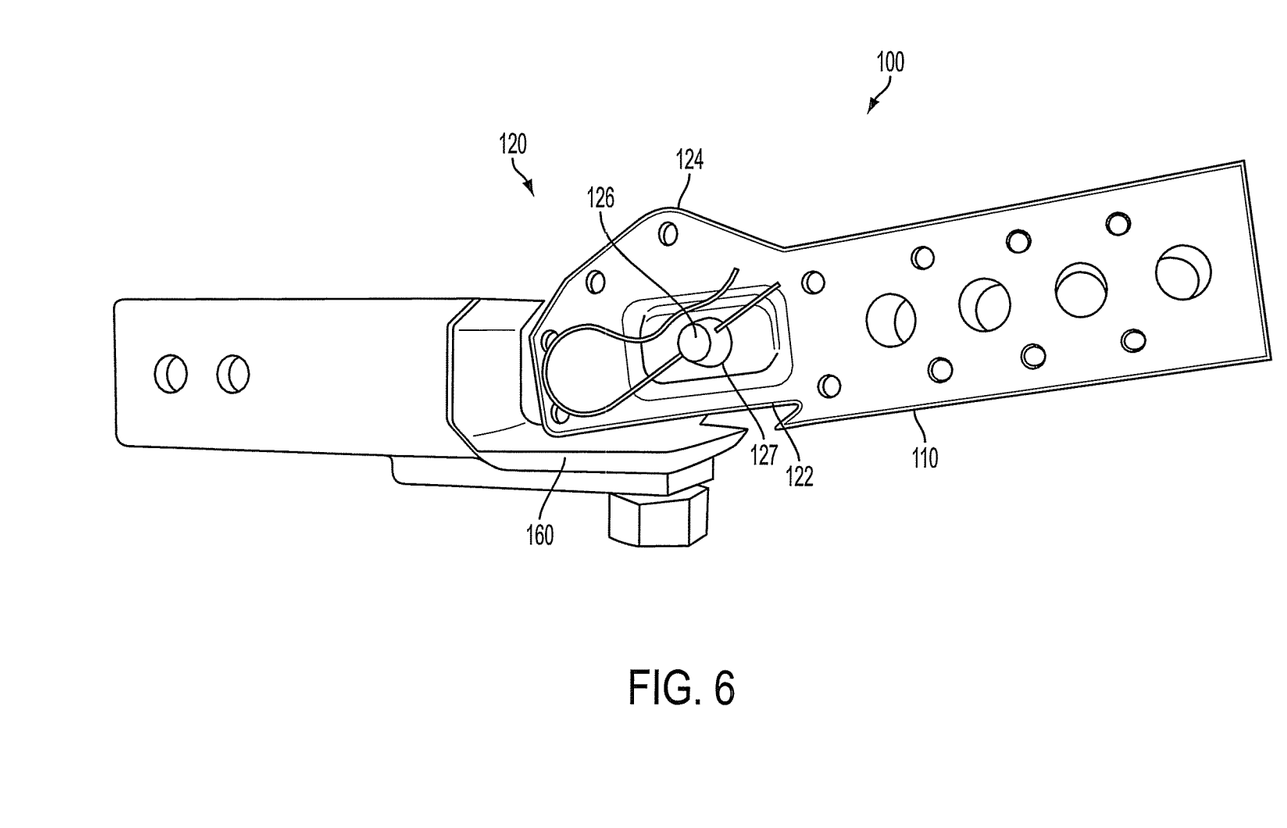
FIG. 6 is a first side view of the hitch mechanism of FIG. 1 connected to the tow ball in the unlocked position and rotated up.
Figure 7:
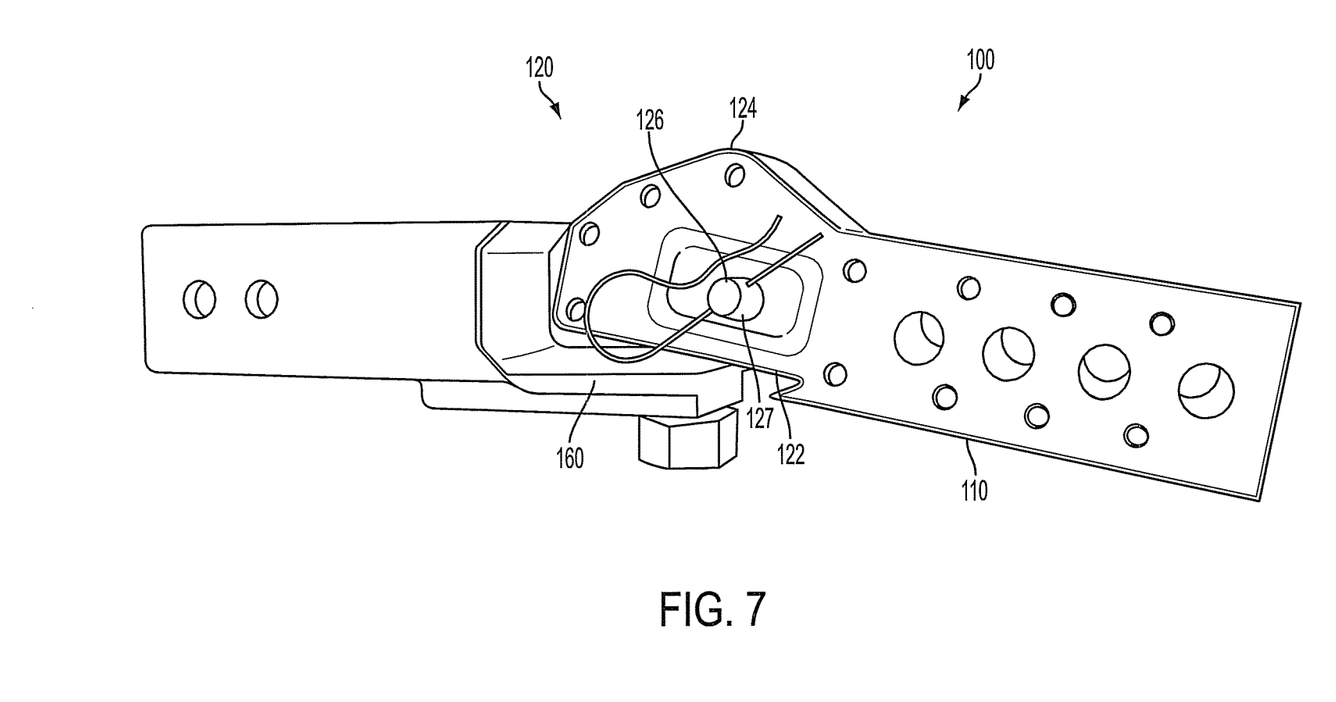
FIG. 7 is a first side view of the hitch mechanism of FIG. 1 connected to the tow ball in the unlocked position and rotated down.

As explained above, when the mechanism 100 is in a non-rigid and unlocked position, the mechanism 100 can rotate, swivel, and articulate relative to the tow ball 100 in a plurality of directions. For example, FIG. 6 is a first side view of the mechanism 100 rotated in an upwards direction, and FIG. 7 is a first side view of the mechanism 100 rotated in a downwards direction. The clearance 170 between the flat side 122 of the mating member 120 and the tow hitch 160 provides room for the mating member 120 to rotate relative to the tow hitch 160.

Figure 8:
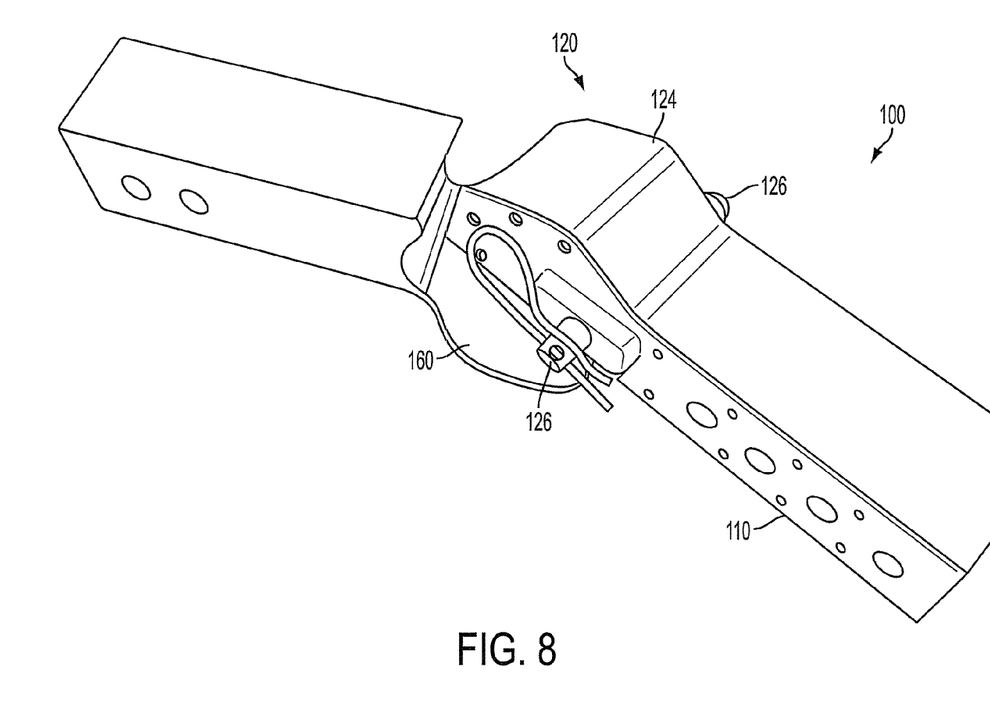
FIG. 8 is a top view of the hitch mechanism of FIG. 1 connected to the tow ball in the unlocked position and rotated left.
Figure 9:
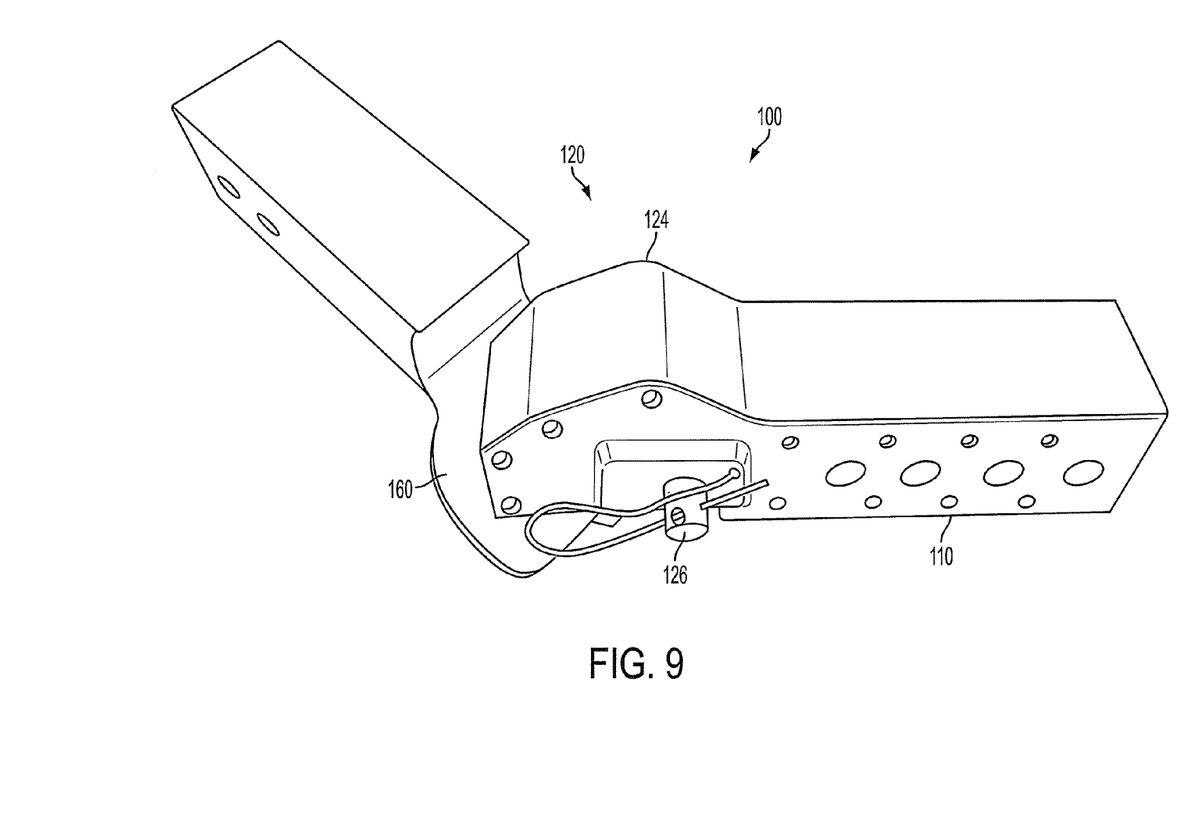
FIG. 9 is a top view of the hitch mechanism of FIG. 1 connected to the tow ball in the unlocked position and rotated right.

Similarly, FIG. 8 is a top view of the trailer hitch mechanism 100 rotated in a left direction, and FIG. 9 is a top view of the mechanism 100 rotated in a right direction.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. An apparatus comprising:
    an elongated shaft for connecting with a ramp or trailer; and
    a mating member for connecting with a tow ball of a tow hitch,
    wherein the mating member includes a chamber disposed therein for housing the tow ball in a first position and in a second position, the first position horizontally adjacent the second position,
    wherein when the tow ball is in the first position in the chamber, the mating member and the elongated shaft are rigid relative to the tow hitch, and
    wherein when the tow ball is in the second position in the chamber, the mating member and the elongated shaft are non-rigid relative to the tow hitch.

2. The apparatus of claim 1 wherein the mating member includes a first side defining an open side of the chamber.

3. The apparatus of claim 1 wherein the mating member includes a domed side defining a domed side of the chamber.

4. The apparatus of claim 1 further including first and second opposing apertures disposed in the mating member, wherein the first and second opposing apertures are suitable for receiving a single fastener therethrough.

5. The apparatus of claim 4 wherein the tow ball includes a tow ball aperture suitable for receiving the fastener therethrough.

6. The apparatus of claim 5 wherein when the tow ball is in the first position in the chamber, the fastener is disposed in the first and second opposing apertures of the mating member and in the tow ball aperture of the tow ball.

7. The apparatus of claim 5 wherein when the tow ball is in the second position in the chamber, the fastener is disposed in the first and second opposing apertures of the mating member and adjacent to the tow ball.

8. The apparatus of claim 5 wherein the fastener includes a pin.

9. The apparatus of claim 8 wherein the pin includes a spring loaded pin.

10. The apparatus of claim 1 wherein when the tow ball is in the first position in the chamber, the mating member is flush with the tow hitch.

11. The apparatus of claim 1 wherein when the tow ball is in the second position in the chamber, a clearance is disposed between the mating member and the tow hitch.

12. The apparatus of claim 1 wherein when the tow ball is in the second position in the chamber, the mating member is capable of rotating in any of up, down, left, and right directions relative to the tow hitch.

13. A mating member of a hitch mechanism comprising:
    a curved side defining a chamber disposed therein for housing a tow ball in a first portion of the chamber or in a second portion of the chamber, the first portion of the chamber horizontally adjacent the second portion of the chamber;
    a flat side defining an opening of the chamber; and
    first and second opposing apertures disposed in the curved side suitable for receiving a single fastener therein,
    wherein the first portion of the chamber has a first diameter, and the second portion of the chamber has a second diameter, the first diameter different than the second diameter, wherein the first portion of the chamber is capable of housing a whole tow ball, and wherein the member is rigid relative to the tow ball when the first portion of the chamber houses the whole tow ball.

14. The mating member of claim 13 wherein the first diameter is larger than the second diameter.

15. The mating member of claim 13 wherein the second portion of the chamber is capable of housing a majority of a tow ball such that a portion of the tow ball is not housed by the chamber.

16. The mating member of claim 15 wherein the member is non-rigid relative to the tow ball when the second portion of the chamber houses the majority of the tow ball such that the portion of the tow ball is not housed by the chamber.

17. The mating member of claim 16 wherein the member is capable of rotating in any of up, down, left, and right directions when the member is non-rigid relative to the tow ball.

18. The mating member of claim 13 wherein a tow ball is capable of sliding between the first portion of the chamber and the second portion of the chamber.

* * * * *